(12) United States Patent
Brady

(10) Patent No.: US 7,000,329 B2
(45) Date of Patent: *Feb. 21, 2006

(54) TRANSPARENT MEASURING DEVICE

(76) Inventor: John R. Brady, 20041 Osterman, #R4, Lake Forest, CA (US) 92630

( * ) Notice: Subject to any disclaimer, the term of this patent is extended or adjusted under 35 U.S.C. 154(b) by 152 days.

This patent is subject to a terminal disclaimer.

(21) Appl. No.: 10/842,012

(22) Filed: May 7, 2004

(65) Prior Publication Data

US 2004/0205975 A1 Oct. 21, 2004

Related U.S. Application Data

(63) Continuation of application No. 10/224,884, filed on Aug. 21, 2002, now Pat. No. 6,799,379.

(51) Int. Cl.
  *G01B 3/14* (2006.01)

(52) U.S. Cl. .............................. 33/562; 33/1 B; 33/494
(58) Field of Classification Search ................... 33/562, 33/563, 564, 566, 489, 483, 484, 488, 113, 33/492, 493, 494, 679.1, 464, 3 A; 359/436, 359/438, 439
See application file for complete search history.

(56) References Cited

U.S. PATENT DOCUMENTS

| 1,523,919 A | | 1/1925 | Vitek et al. |
|---|---|---|---|
| 1,745,188 A | | 1/1930 | Pipirs |
| 2,230,010 A | * | 1/1941 | Owens .................. 33/489 |
| 2,519,727 A | | 8/1950 | Yezdan |
| 2,563,191 A | | 8/1951 | Russ |
| 2,604,270 A | | 7/1952 | Collins |
| 2,736,097 A | | 2/1956 | Coleman, Jr. |
| 2,892,437 A | | 6/1959 | Natoli |
| 2,905,138 A | * | 9/1959 | Nicolaus .................. 116/304 |
| 2,948,064 A | | 8/1960 | Wentsel |
| 3,398,447 A | * | 8/1968 | Dolgorukov ............. 29/407.01 |
| 3,599,338 A | * | 8/1971 | Gillespie et al. ............. 33/403 |
| 3,727,242 A | * | 4/1973 | Miller ........................... 4/314 |
| 4,742,619 A | | 5/1988 | Swanson |
| 4,779,346 A | | 10/1988 | Schafer |
| 4,965,943 A | | 10/1990 | Adams |
| 5,101,569 A | | 4/1992 | Watkins |
| 5,347,721 A | | 9/1994 | Asterino, Jr. |
| 5,461,795 A | | 10/1995 | Kok |
| 5,511,316 A | | 4/1996 | Fischer et al. |
| 5,557,996 A | | 9/1996 | Reber et al. |
| 5,577,328 A | | 11/1996 | Kerry, Sr. |
| 5,746,001 A | | 5/1998 | Fisher |
| 5,749,149 A | | 5/1998 | Claytor |
| 5,819,422 A | | 10/1998 | Schafer |
| 6,061,920 A | * | 5/2000 | McMorrow .................. 33/494 |
| 6,093,182 A | | 7/2000 | Lampropoulos et al. |
| 6,158,135 A | | 12/2000 | Rank |
| 6,205,673 B1 | | 3/2001 | Larsen et al. |

* cited by examiner

Primary Examiner—R Alexander Smith
(74) Attorney, Agent, or Firm—Stetina Brunda Garred & Brucker

(57) ABSTRACT

A transparent measuring device is disclosed. The transparent measuring device includes a planar structure formed from a sheet of transparent material having a top surface and a bottom surface and at least one raised rib formed of a transparent material on the top surface of the planar structure such that incident light is reflected/refracted on the raised rib to provide a visual graduation. The raised ribs include a top surface that may be colored such that the raised rib forms a dual-line graduation.

11 Claims, 2 Drawing Sheets

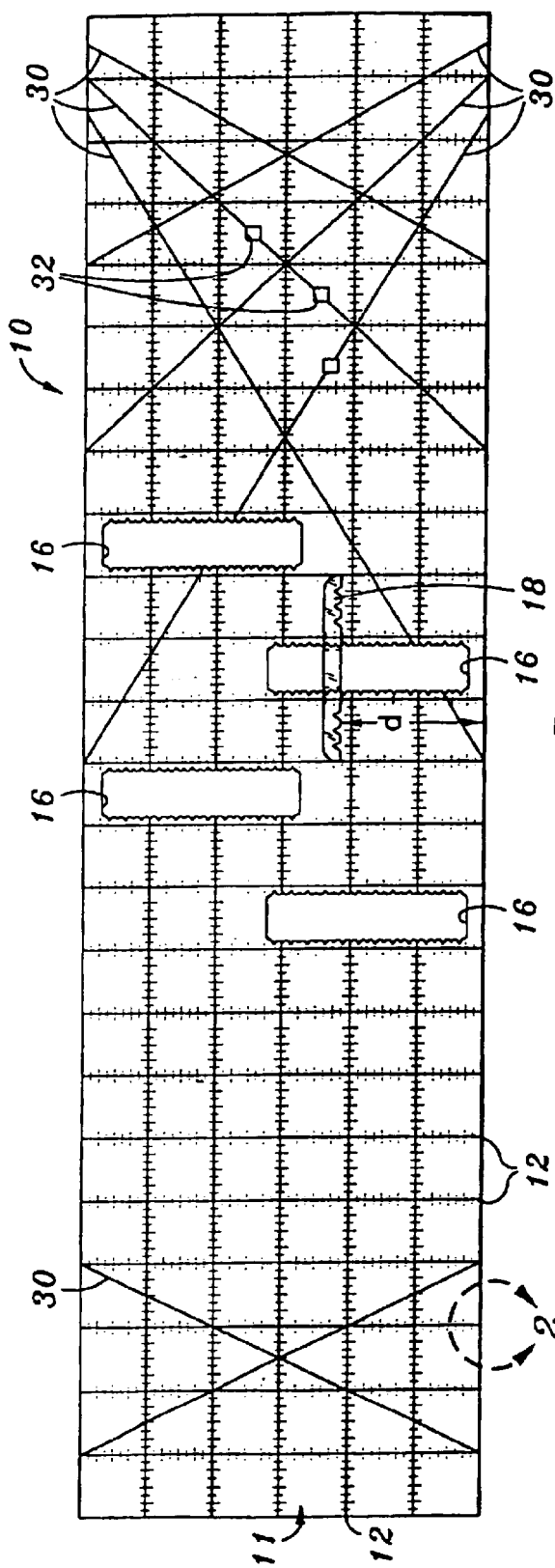
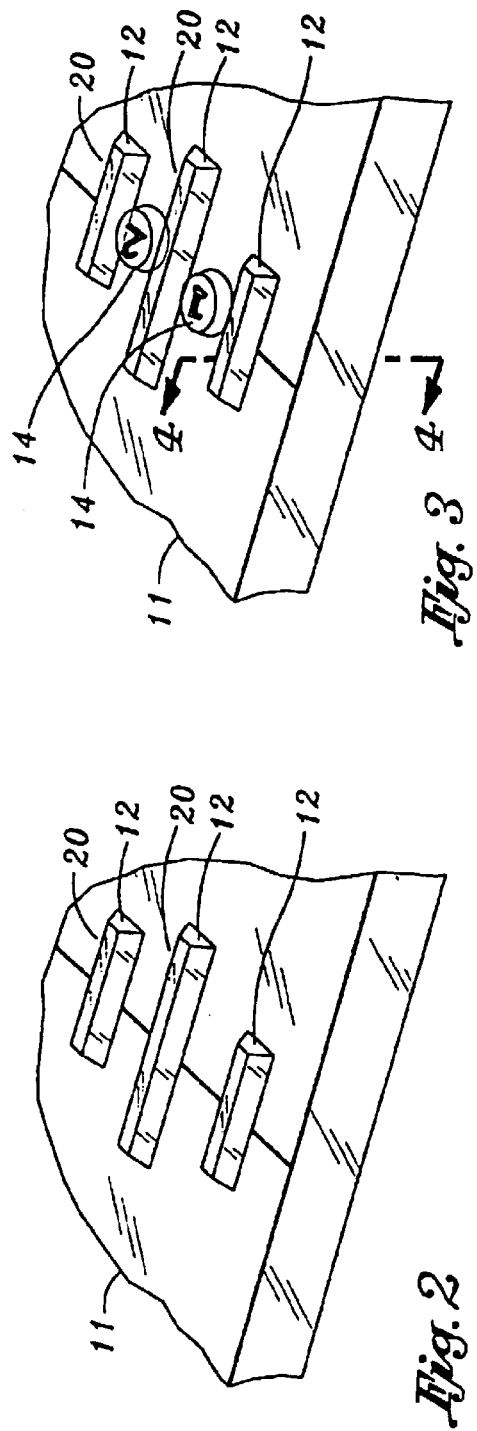

TRANSPARENT MEASURING DEVICE

RELATED APPLICATIONS

The present application is a continuation of U.S. application Ser. No. 10/224,884 entitled "TRANSPARENT MEASURING DEVICE" filed Aug. 21, 2002 now U.S. Pat. No. 6,799,379.

STATEMENT RE: FEDERALLY SPONSORED RESEARCH/DEVELOPMENT (Not Applicable)

BACKGROUND OF THE INVENTION

The present invention relates generally to measuring devices and more particularly to a measuring device for measuring, marking or cutting various colors of material, e.g., material for quilting.

Crafts, such as quilting, may require exact measuring and cutting of fabrics of various colors and patterns. Standard rulers and yardsticks have several disadvantages when being used for this purpose. The marks and lines on transparent rulers and yardsticks often can not be seen due to the color and/or pattern of the fabric.

One method of overcoming these disadvantages is a measuring device having lines of two colors as disclosed in U.S. Pat. No. 4,779,346. The measuring device disclosed in U.S. Pat. No. 4,779,346 has vertical and horizontal lines with a first line being superimposed on a second line. The first line is a lesser breadth than the second line so that the second line is visible on each side of the first line. The first line and second line are contrasting colors.

The manufacturing process for creating a measuring device such as the one disclosed in U.S. Pat. No. 4,779,346 requires several steps and a great deal of precision. Thus, such a process is costly and prone to error.

Thus, there is a need for a measuring device that can be used with materials of various colors and patterns, such as fabrics used for quilting. The device should be a configuration which allows for a manufacturing process that is not prone to errors.

BRIEF SUMMARY OF THE INVENTION

An aspect of the invention may be regarded as a transparent measuring device. The measuring device includes a planar structure formed of a sheet of transparent material having an upper surface and a lower surface. The measuring device includes at least one raised rib having a proximal end and a distal end with the proximal end attached to the lower surface of the planar structure. Incident light is internally reflected and refracted through the angular surface of the raised rib to provide a visual graduation through the planar structure. A surface of the distal end of the raised rib may be colored such that the raised rib forms a dual-line graduation. The color may be stamped, pad printed or otherwise applied onto the raised rib.

The raised ribs may have a square shoulder stepped cross-sectional configuration or a beveled sidewall cross-sectional configuration.

The transparent measuring device may include one or more windows. The windows may include a movable tab that can be positioned at various positions in the window.

The transparent measuring device may include raised measuring markers having a proximal end and a distal end and formed of a transparent material and attached at the proximal end to the lower surface of the planar structure such that incident light is reflected/refracted on the raised measuring marker to provide a visual graduation.

The transparent measuring device may be made of a plastic material. The raised ribs may be made of a plastic material. The raised measuring markers may be made of a plastic material.

BRIEF DESCRIPTION OF THE DRAWINGS

These as well as other features of the present invention will become more apparent upon reference to the drawings wherein:

FIG. 1 illustrates a transparent measuring device formed in accordance with the present invention;

FIG. 2 is a side view of a cutaway portion of the transparent measuring device of FIG. 1 showing raised ribs of the measuring device;

FIG. 3 is a side view of a cutaway portion of the transparent measuring device of FIG. 1 showing raised ribs of the measuring device and raised measuring markers;

DETAILED DESCRIPTION OF THE INVENTION

Figure 4:
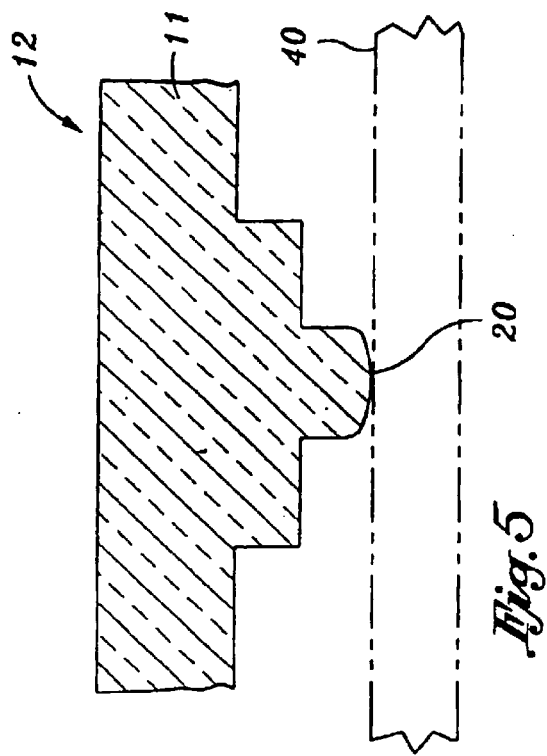
FIG. 4 is a cross sectional view of one of the raised ribs shown in FIG. 2.

Referring now to the drawings wherein the showings are for purposes of illustrating preferred embodiments of the present invention only, and not for purposes of limiting the same, FIG. 1 illustrates a transparent measuring device 10 formed in accordance with the present invention. The measuring device 10 includes a planar structure 11. The planar structure 11 has an upper surface and a lower surface and is formed of a transparent material, such as a plastic material. In exemplary embodiments such as the one shown in FIG. 1, the planar structure 11 is generally rectangular in shape. The corners of the planar structure 11 may be substantially sharp as shown in FIG. 1, or they may be substantially rounded. It will be appreciated that the planar structure 11 of the measuring device may be a shape other than rectangular, e.g., square or triangular. The upper surface of the planar structure 11 is flat.

The lower surface of the planar structure 11 has lines (i.e., markings) such as those shown in FIG. 1. The lines are raised ribs 12, such as those shown in FIGS. 2 and 4. The raised ribs 12 are formed of a transparent material, such as plastic, on the lower surface of the planar structure 11. The raised ribs 12 are formed in a manner that allows incident light to be internally reflected and refracted on the angular surfaces of the raised rib to provide a visual graduation. The raised ribs 12 are attached to the lower surface of the planar structure at a proximal end of the raised rib and include a surface 20 at the distal end that is substantially parallel to the lower surface of the planar structure 11. The surface 20 at the distal end of the raised rib may be slightly rounded due to color being applied to the distal end surface as further described below.

Figure 5:
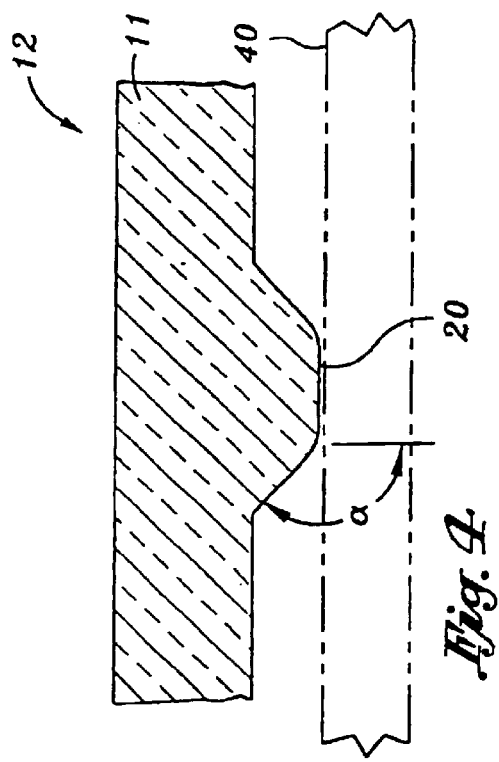
FIG. 5 is a cross sectional view a second embodiment of a raised rib.
Figure 6:
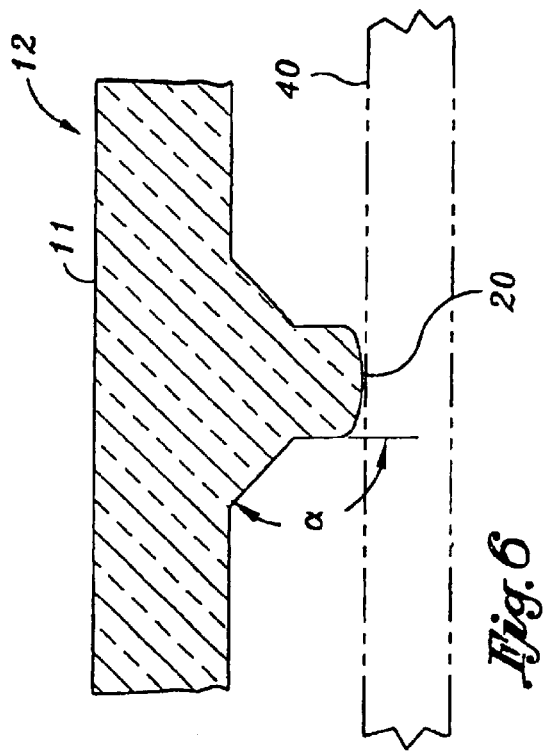
FIG. 6 is a cross sectional view of a third embodiment of a raised rib.

The configuration of the raised ribs allows for internal reflection and refraction of incident light on the angular surfaces of the raised ribs to provide a visual graduation. A square configuration will not provide such a reflection and refraction. The raised ribs 12 shown in FIGS. 4–6 include angled and/or multi-tiered side walls that allow for such reflection/refraction. In the exemplary embodiment shown in FIGS. 2 and 4, the raised ribs 12 have a beveled sidewall cross-sectional configuration having an angle α. FIG. 6 illustrates an alternative beveled sidewall cross-sectional configuration having an angle α. FIG. 5 illustrates another embodiment of a rib 12 having a square shoulder stepped cross-sectional configuration. Light enters the measuring device 10 through the upper surface of the planar structure 11 and is internally reflected and refracted on the angular surfaces of the raised rib 12. As shown in FIGS. 4–6, the transparent measuring device 10 may be used on a piece of fabric 40. The fabric can be a light fabric, a dark fabric or a fabric that includes both light and dark colors. The internal reflection and refraction of light allows the lines (raised ribs) 12 to be viewed regardless of the color(s) and/or patterns of the fabric 40.

In exemplary embodiments, the raised ribs 12 include coloring on the surface 20 of the distal end of the raised rib. The coloring on the surface 20 of the distal end of the raised rib forms a dual-line graduation. The color may be hot stamped, pad printed or otherwise applied onto the top surface 20 of the raised rib. The molding process and/or application of color may cause the surface at the distal end of the raised rib to be slightly rounded (i.e., crowned) as shown in FIGS. 4–6. The color can be any color. However, the color is preferably a dark color, such as black or navy blue, because a dark color is optimal for viewing any color or combination of colors of fabric through the measuring device 10.

In exemplary embodiments, such as the one shown in FIG. 1, the transparent measuring device 10 includes one or more windows 16 which allow an unobstructed viewing of the fabric disposed beneath the measuring device. Preferably, the window 16 is a hole, such as a rectangular hole, formed in the planar structure 11 of the measuring device. Additionally, the sides of the window are provided with ⅛ inch notches which aid in visual alignment of the fabric relative the measuring device. The windows 16 preferably each include a movable alignment tab 18 that can be positioned at various locations in the window 16. For example, the tab may be positioned by sliding or pressing the tab to the desired location in the window 16. Preferably, the alignment tab includes notches to aid the user in alignment. For example, the tab may include notches at ⅛" intervals. Preferably, the alignment tab 18 is thin, e.g., 0.020 inch thick and is slidably secured behind the window 16. The movable tab 18 has a straight edge that can be moved within the window and used to align the measuring device so that the fabric can be cut using a straight edge of the measuring device. For example, a quilt pattern may require fabric strips having a certain width, e.g., ½ inch. For example, tabs 18 can be used to line up fabric so that a rotary cutter can be used to cut a strip of fabric along a straight edged of the measuring device 10, for example, a ½ inch strip of fabric to be used for a quilt.

Exemplary embodiments may also include measuring markers 14, such as those shown in FIG. 3. For example, measuring markers 14 may be numbers that are used to indicate the number of inches from the left edge of the measuring device 10. Preferably, the measuring markers 14 are formed of a transparent material, such as plastic, and are raised, like the raised ribs 12 such that incident light is reflected and refracted on the raised measuring marker to provide a visual graduation. Color may be applied, e.g., hot stamped, on the distal end surface of the measuring markers 14.

In a preferred embodiment, shown in FIG. 1, the transparent measuring device is 24 inches by 6 inches. In exemplary embodiments, the planar structure 11 of the measuring device 10 is approximately ⅛ inch thick and the raised ribs 12 are approximately 1/32 inch high. In the embodiment shown, there are lines (raised ribs) 12 at one inch intervals and shorter lines (hatch marks) that are also raised ribs 12 at one eighth (⅛) inch intervals. The embodiment shown also includes additional lines 30 at various angles that can be used for marking and/or measuring. Preferably, there are small windows 32 along the additional lines 30 to aid in alignment and provide an unobstructed view of the underlying fabric. The additional lines may also be formed of raised ribs. It will be appreciated that other embodiments of the measuring device 10 may be different sizes and/or may have markings at different intervals. For example, interval markings may be planar structured on the metric system of measurements.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A measuring device, comprising:
    a transparent planar structure having an upper surface and a lower surface; and
    a measuring element including at least one raised rib formed of a transparent material, the raised rib having a proximal end attached to the lower surface and a distal end in the form of a colored surface, and the raised rib being so structured to create a dual-line visual graduation when a light propagates through.

2. The measuring device of claim 1, wherein the colored surface has a surface area smaller than an area of the proximal end.

3. The measuring device of claim 1, wherein the raised rib further comprises at least one angular surface extending from the proximal end to the distal end.

4. A measuring device used for measuring, marking and cutting an underlying material, comprising:
    a substantially transparent planar structure having an upper surface and a lower surface; and
    a measuring element including at least one raised rib protruding from the lower surface, the raised rib having a proximal end attached to the lower surface and a distal end to be in direct contact with the underlying material, wherein the raised rib is so structured to produce reflection, refraction or reflection and refraction on an incident light propagating therethrough;
    the planar structure having at least one window therein wherein at least one additional raised rib is adjacent to an edge of the window.

5. The measuring device of claim 4, wherein the distal end has a surface area smaller than that of the proximal end.

6. The measuring device of claim 4, wherein the raised rib further comprises at least one angular surface extending between the proximal ends.

7. The measuring device of claim 4, wherein the raised rib is fabricated from a transparent material.

8. A transparent measuring device, comprising:
    a transparent planar structure, having an upper surface, a lower surface and at least a window therein; and
    a measuring element including a plurality of raised ribs made of a transparent material and extending across the lower surface, each of the raised ribs serving as a measuring element and having a proximal surface attached to the lower surface and a distal end opposite to the proximal end, and the raised ribs are so configure to refract, reflect, and refract and reflect a light incident thereon.

9. The measuring device of claim 8, wherein at least one of the raised ribs extends towards an edge of the window.

10. The measuring device of claim 8, wherein each of the raised ribs further comprises at least one angular surface extending from the proximal end to the distal end.

11. The measuring device of claim 8, wherein the distal end has a colored surface.

* * * * *